United States Patent [19]
Mattison

[11] Patent Number: 4,800,670
[45] Date of Patent: * Jan. 31, 1989

[54] FISHING LURE

[76] Inventor: Robert N. Mattison, 5826 McKinley Pl. N., Seattle, Wash. 98103

[*] Notice: The portion of the term of this patent subsequent to Sep. 15, 2004 has been disclaimed.

[21] Appl. No.: 51,083

[22] Filed: May 15, 1987

Related U.S. Application Data

[63] Continuation of Ser. No. 813,677, Dec. 23, 1985, Pat. No. 4,693,032, Continuation-in-part of Ser. No. 607,284, May 4, 1984, Pat. No. 4,589,221, and a continuation-in-part of Ser. No. 648,458, Sep. 7, 1984, Pat. No. 4,581,839.

[51] Int. Cl.$^4$ .............................................. A01K 85/00
[52] U.S. Cl. ..................................... 43/17.6; 43/42.06
[58] Field of Search ................... 43/17.4, 42.24, 17.5, 43/42.33, 42.34, 43.16, 42.06

[56] References Cited

U.S. PATENT DOCUMENTS

| | | |
|---|---|---|
| 62,042 | 2/1867 | Lee, Jr. . |
| 272,317 | 2/1883 | Pflueger . |
| 756,438 | 4/1904 | Uhlenhart . |
| 2,117,206 | 5/1938 | Neff . |
| 2,674,058 | 4/1954 | Lindenberg . |
| 2,791,058 | 5/1957 | Bettini . |
| 2,797,517 | 7/1957 | Eriksen . |
| 2,878,611 | 3/1959 | Netherton et al. ................. 43/42.06 |
| 3,413,749 | 12/1968 | Jeffers . |
| 3,434,230 | 3/1969 | Littlefield . |
| 3,568,354 | 3/1971 | Yacko . |
| 3,576,987 | 5/1971 | Voight et al. . |
| 3,579,895 | 5/1971 | Orn . |
| 3,597,362 | 8/1971 | Bollycky et al. . |
| 3,680,250 | 8/1972 | Hetrick . |
| 3,762,092 | 10/1973 | Bercz et al. . |
| 3,861,072 | 1/1975 | Holcombe . |
| 3,863,380 | 2/1975 | Purlia . |
| 3,895,455 | 7/1975 | Johnston . |
| 3,921,328 | 11/1975 | Holcombe . |
| 3,940,868 | 3/1976 | Northcutt . |
| 4,074,455 | 2/1978 | Williams, Jr. . |
| 4,501,084 | 2/1985 | Mori . |
| 4,581,839 | 4/1986 | Mattison . |
| 4,589,221 | 5/1986 | Mattison . |

FOREIGN PATENT DOCUMENTS

| | | |
|---|---|---|
| 2232268 | 1/1975 | France . |
| 59225 | 4/1938 | Norway . |
| 2100103 | 12/1982 | United Kingdom . |

OTHER PUBLICATIONS

"New from Sevenstrand," Preview '85, Circle No. 325 on Reader Service Card, AFTMA Booth 0706, Fishing Tackle Retailer Magazine, Jul. 1984, p. 206.

Primary Examiner—Nicholas P. Godici
Assistant Examiner—Karen Skillman
Attorney, Agent, or Firm—Seed and Berry

[57] ABSTRACT

Fishing lures which releasably secure chemiluminescent capsules therein. Releasable mountings are sized to receive and snuggly hold the resilient chemiluminescent capsules and enable them to be readily removed and replaced, despite possible variances in length.

In one group of preferred embodiments, the chemiluminescent capsules are mounted in the interior of a transparent lure for easy insertion and removal. Another preferred embodiment enables a chemiluminescent capsule to be readily affixed to a segment of fishing line using straps without cutting of the line. Another embodiment has the capsule attached to loops formed in the shank of a hook.

21 Claims, 3 Drawing Sheets

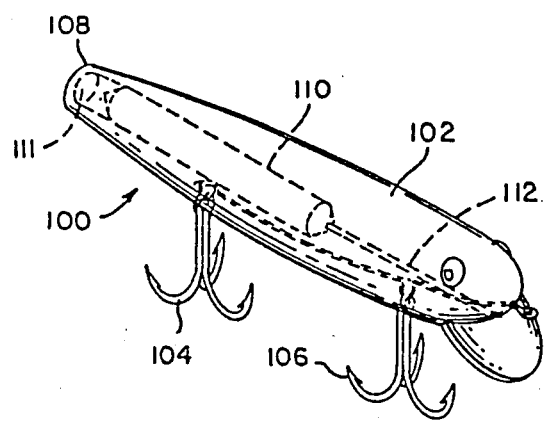
FIG. 1
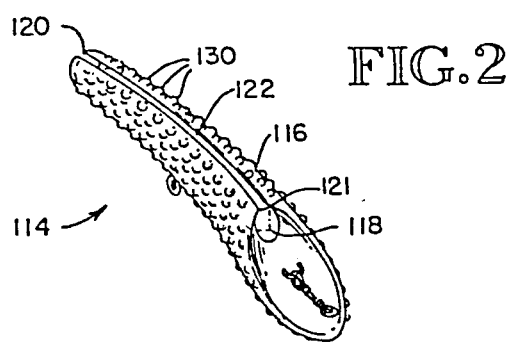
FIG. 2
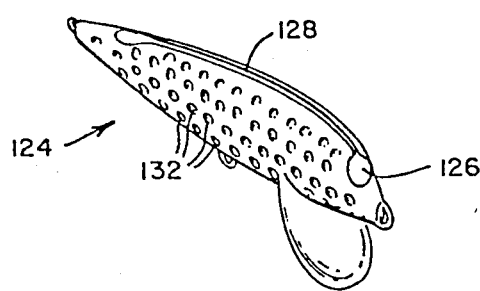
FIG. 3
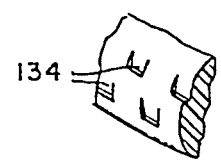
FIG. 5
FIG. 4

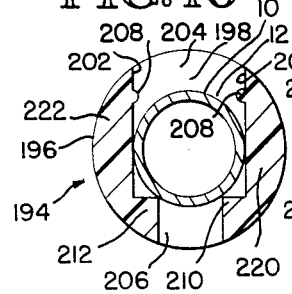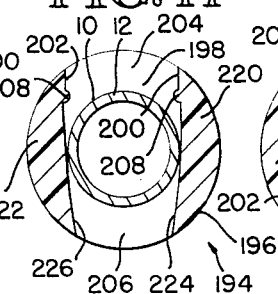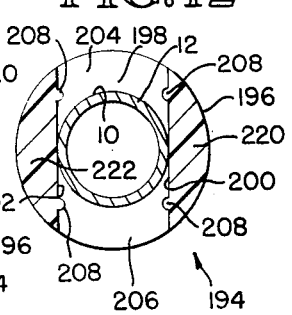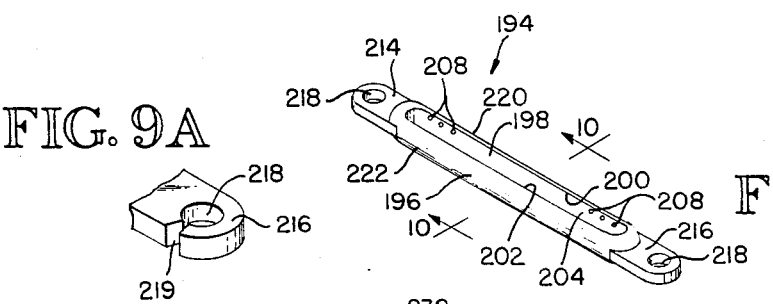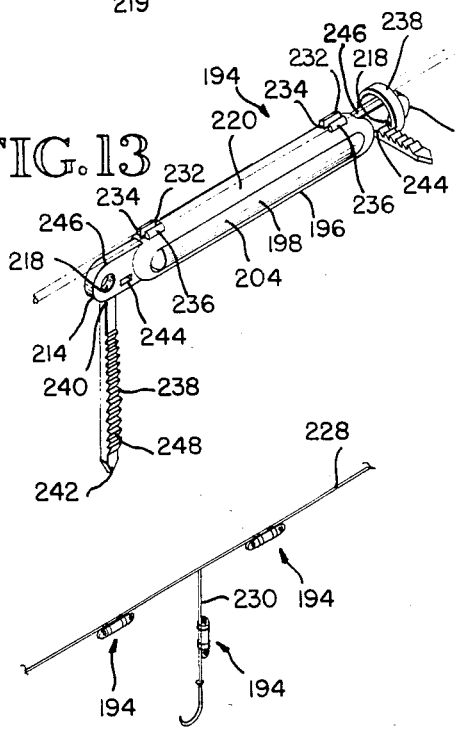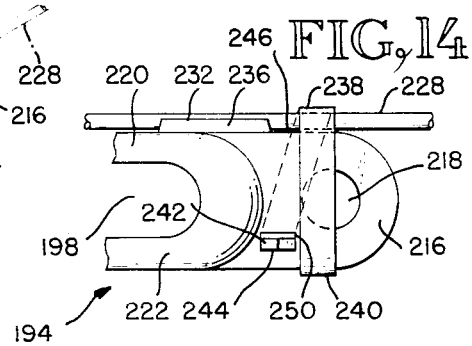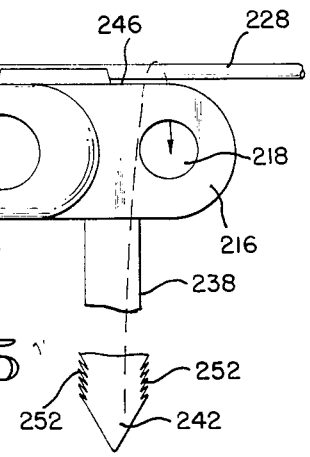

FISHING LURE

RELATED APPLICATIONS

This application is a continuation of Ser. No. 813,677, filed Dec. 23, 1985 now U.S. Pat. No. 4,698,032 entitled "Illuminated Fishing Lure", which is a continuation-in-part of prior co-pending application applications Ser. No. 607,284, filed May 4, 1984 entitled "Fishing Lure and Entrapment Device," now U.S. Pat No. 4,589,221 Ser. No. 648,458, filed Sept. 7, 1984 entitled "Illuminated Fishing Lure," now U.S. Pat. No. 4,581,839.

TECHNICAL FIELD

The present invention relates generally to fishing equipment, and more particularly to illuminated fishing lures.

BACKGROUND ART

In the past, many attempts have been made to improve the ability of fishing lures to attract fish by enhancing the reflective or illuminative properties of the lures. For example, electrically powered lights have been tried in conjunction with fishing lures. Many problems are associated with the use of electrical lights in an underwater water environment, however. Water is a conductor and salt water is highly corrosive. Thus, water can cause short circuits and cause metal contacts and other parts to corrode. When the electricity for lights is supplied through power lines, the extension and maintenance of such lines is difficult and particularly impractical for sports fishing. Using a power line when fishing with a reel at any appreciable depth is not feasible. Similarly, the use of a light bulb and battery in a sealed compartment has associated problems. Insufficient illumination, heavy weight, bulky size, leakage of water into the compartment, replacement of batteries, and switching of power to the light bulb are a few of the problems.

As an alternative to electrically powered lights, florescent paint has been used on fishing lures. The amount of illumination provided by such lures, however, is minimal. This is particularly true when fishing on cloudy days or at substantial depths.

Attempts to provide increased illumination have been enhanced by the creation of small chemiluminescent capsules, commonly known as "light sticks." Such capsules typically comprise a sealed glass tube containing a first chemical housed within an outer resilient plastic tube. A second chemical is housed intermediate the tubes. By bending the outer resilient tube, the inner glass tube can be broken to allow the two chemicals to mix and react, causing illumination of the capsule. Chemiluminescent capsules of this type are described in detail in U.S. Pat. No. 3,576,987 to Voight, et al.

Small chemiluminescent capsules are attractive for use with fishing lures because they overcome the problems discussed previously with respect to electrical or florescent systems. To date, however, the use of chemiluminescent capsules has been hampered by lack of an adequate means to readily attach and detach the capsules to a fishing line or fishing lure.

A particular problem presented by existing chemiluminescent capsules is the fact that they are not manufactured with a uniform length. The length of small capsules may vary plus or minus 10%. Such variance has created difficulties in designing fittings for such capsules which, until the present invention have not been adequately addressed.

Another problem concerns the difficulty and time consuming procedure required to attach the holder for the chemiluminescent capsule to the fishing line. This is especially a problem for commercial longline fishermen desiring to attach the chemiluminescent capsule to existing ground lines and the gaglions attached thereto. Similar problems exist for other type commercial fishermen and sports fishermen.

It will be appreciated that there has been a need for a convenient and inexpensive illuminating fishing lure which does not require the use of wires, batteries, or light bulbs, and which provides an easily used, selfcontained source of light using a chemiluminescent capsule and a holder therefor. The holder should be easily and quickly attachable to an existing fishing line without cutting and re-tying the line or tying knots in the line. Moreover, the same holder should be usable with lines of significantly different diameter. The holder should also be adjustable to permit the holder to stay stationary or slidably move on the line, as selected by the user. The holder should have a smooth profile so as to pass through automatic baiters without difficulty. Furthermore, the attachment and detachment of the chemiluminescent capsule to the holder should be easy and quick, but yet hold the capsule firmly in place during usage of the holder against the normal forces encountered on the capsule during usage. The holder should have simplicity of design and use, and be moldable as an integral unit. The present invention fulfills these needs and further provides other related advantages.

DISCLOSURE OF THE INVENTION

It is an object of this invention to provide a fishing lure which will house a chemiluminescent capsule and allow such capsule to be readily inserted and removed therefrom.

It is another object of this invention to provide such a fishing lure which will maximize the attractive effect of the chemiluminescent capsule.

It is another object of this invention to provide a means for quickly attaching and detaching chemiluminescent capsules to a fishing line.

It is another object of this invention to provide means for attachment of such fishing lures to existing fishing line of varying diameters without cutting and re-tying the line or tying knots in the line.

It is another object of this invention to provide such fishing lures and attachment means which will work well with capsules of variable length.

These and other objects which will become more apparent as the invention is described more fully below are obtained by providing, in a plurality of embodiments, fishing lures including means for releasably securing chemiluminescent capsules therein. Releasable mountings are sized to receive and snuggly hold the resilient chemiluminescent capsules and enable them to be readily popped out and replaced, despite possible variances in length.

In one group of preferred embodiments, the chemiluminescent capsules are releasably mounted within a translucent lure for easy insertion and removal. Other preferred embodiments enable a chemiluminescent capsule to be readily affixed to a segment of fishing line. Another embodiment enables a capsule to be directly retained by the shank of a hook.

BRIEF DESCRIPTION OF THE DRAWINGS

FIG. 1 is an isometric view of one embodiment of the invention for housing a chemiluminescent capsule within a translucent fishing lure.

FIG. 2 is an alternate embodiment for housing a chemiluminescent capsule within a translucent fishing lure.

FIG. 3 is an isometric view of a modified version of the embodiment of FIG. 2.

FIG. 4 is a detail view of an alternative form of surface irregularity for the outer surface of the lures of FIGS. 2 and 3.

FIG. 5 is a detail view of an alternative form of surface irregularity for the outer surface of the lures of FIGS. 2 and 3.

FIG. 9 is an isometric view of another lure embodiment of the invention.

FIG. 9A is an enlarged fragmentary view of an alternative embodiment for the lure shown in FIG. 9.

FIG. 10 is an enlarged cross-sectional view taken through the line 10—10 of FIG. 9.

FIG. 11 is a cross-sectional view of an alternative embodiment for the lure of FIG. 9 as if also taken through the line 10—10 of FIG. 9.

FIG. 12 is a cross-sectional view of yet another alternative embodiment for the lure of FIG. 9 as if also taken through the line 10—10 of FIG. 9.

FIG. 13 is an isometric view of a modified version of the lure of FIG. 9 with attachment straps shown attaching the lure to a fishing line.

FIG. 14 is an enlarged fragmentary view of the lure of FIG. 13 with the one strap through its locking aperture.

FIG. 15 is an isometric view of an alternative embodiment of the lure of FIG. 13 with modified attachment straps.

FIG. 16 is an isometric view of the lures of FIGS. 13 and 15 shown attached to a longline ground line and ganglion.

BEST MODE FOR CARRYING OUT THE INVENTION

Figure 6:
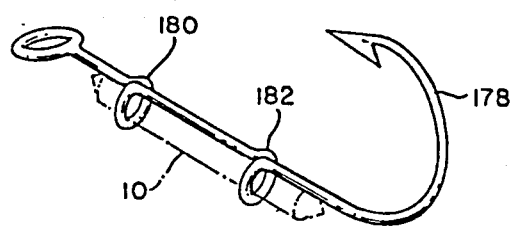
FIG. 6 is an isometric view of an alternative embodiment of the invention for mounting a chemiluminescent capsule to a fish hook.

Fishing lures according to the present invention are designed to allow chemiluminescent capsules to be easily and quickly inserted and removed from the lure, and yet be snuggly held in the lure. Some preferred embodiments of the invention are specially designed to accommodate capsules of variable length and to allow easy attachment to a fishing line. The chemiluminescent capsule 10 has a generally circular cross-section with a resilient outer tubular casing 12. Commercially available capsules of this type can vary in length up to ten percent from the nominal length. A chemiluminescent capsule is activated by bending the capsule to break an inner glass tube (not shown). The activated capsule may then be inserted into the lure. When fishing is complete, or the capsule needs replacing, the capsule is easily removed by applying pressure thereto.

FIG. 1 illustrates one embodiment of the invention. A lure 100 includes a translucent, elongated body 102 fabricated generally in the shape of a small fish. Hooks 104, and 106 depend from the body. A cylindrical capsule bore 108 extends longitudinally from the rear end of the body to a location in the interior of the body. The diameter of the capsule bore is sized to be substantially equal to the diameter of a chemiluminescent capsule 110 so that the chemiluminescent capsule can be slid through a rearward capsule bore opening 111 into the bore for positioning entirely therewithin. The capsule is held in place by the frictional engagement between the capsule outward surface and the interior wall surface of the bore. Extending forwardly from the capsule bore is a relatively small, reduced size bore 112 which extends from the forward end of the capsule bore 108 to the forward end of the lure body. This relatively small bore is used during removal of a capsule from the capsule bore. A small object such as a pin or wire (not shown) is inserted into the relatively small bore to contact the forward end of the capsule in the capsule bore and force it rearwardly to remove the capsule from the capsule bore. In such manner the capsule can be easily removed without the need for a second capsule bore opening in the body.

FIG. 2 illustrates another fishing lure 114 according to the present invention. An elongated body 116 includes a cylindrical capsule bore 118 extending longitudinally through the body from a first opening 120 at the rear of the body to a second opening 121 at the front of the body. The bore is sized such that its diameter is substantially equal to the diameter of a chemiluminescent capsule to be frictionally held in the bore. A slot 122 extends transversely from the bore to the exterior of the lure body.

In operation, the lure of FIG. 2 is used by inserting an activated chemiluminescent capsule into the bore. The body of the lure is preferably fabricated of translucent material so that light from the capsule can project from the bore through the body of the lure to attract fish. Light also radiates out through the slot 122. To remove a chemiluminescent capsule from the bore, a thin object such as a knife blade is aligned with the slot at one end opening of the bore and pushed through the slot and bore to force the capsule out of the other end opening of the bore. Another capsule may then be inserted into the bore as desired. FIG. 3 illustrates a lure 124 similar to the embodiment of FIG. 2, having a bore 126 and a slot 128 communicating therewith.

The outer surface of the lure 114 of FIG. 2 includes a plurality of convex protrusions 130 on its outer surface to diffuse the light from the chemiluminescent capsule. Other surface irregularities, such as the concave indentations 132 illustrated in FIG. 3, the scale-like indentations 134 illustrated in FIG. 4, or the strake-like projections 136 of FIG. 5 may also be used to accomplish the same purpose. Such surface irregularities will cause light from the chemiluminescent capsule to project from the lure at varying angles and additionally cause acoustical effects similar to the sound of fish traveling through water.

FIG. 6 illustrates a similar arrangement according to the present invention where a fish hook 178 includes two spaced apart loops 180, 182 integrally formed in the slender shank portion of the hook for receiving and retaining the chemiluminescent capsule 10. The loops are each formed by turns in the shank to provide a continuous shank design to utilize the resiliency of the shank without requiring affixation of a separate member thereto. The interior diameter of the loops are sized substantially equal to the exterior of the capsule. The loops are spaced apart longitudinally along the shank portion of the hook to securely hold the capsule against water forces impacting on the capsule but yet to minimize blockage of the light emanating from the capsule.

Figure 7:
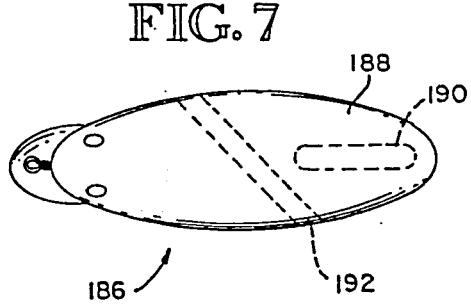
FIG. 7 is a top plan view of an alternate embodiment of a fishing lure according to the invention.
Figure 8:
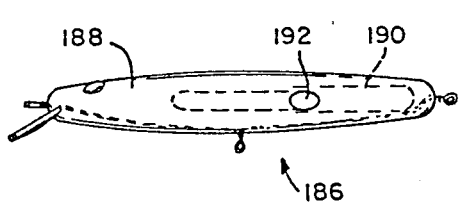
FIG. 8 is a side elevation view of the embodiment of FIG. 7.

FIG. 7 and 8 illustrate another preferred embodiment of the present invention comprising a fish lure 186 having a translucent body 188. An internal air cavity 190 is provided in the rear of the body for buoyancy. If desired, a ballast weight may be inserted within the cavity. A bore 192 extends diagonally across the body when viewed in plan, for receiving a chemiluminescent capsule. The bore extends from one side of the lure body to the other and has an interior bore diameter sized substantially equal to the diameter of the chemiluminescent capsule to be housed in the bore. In operation, a capsule is inserted into the bore for use. When it is desired to remove the capsule, an object is inserted into one end of the bore to force the capsule out the other end of the bore.

Another alternative embodiment of the invention is shown in FIG. 9 comprising a fishing lure or holder 194 having an elongated translucent body 196. The body has a longitudinally extending cavity 198 having a length at least as long as the chemiluminescent capsule to be retained therein. As best shown in FIG. 10, the body cavity 198 is formed in the body by a pair of opposed generally planar sidewalls 200 and 202 spaced apart a distance sufficient to receive the capsule therebetween. The body cavity has first and second opposed longitudinally extending openings 204 and 206, respectively, communicating with the body cavity 198.

Attached to each of the sidewalls 200 and 202 and projecting into the first cavity opening 204 are a plurality of protrusions 208 serving as detents for holding the capsule 10 in the body cavity 198. The protrusions 208 attached to each of the sidewalls includes two sets of three longitudinally spaced apart protrusions. Each set is positioned toward one longitudinal end portion of the body cavity, opposite the set of protrusions on the other sidewall. The protrusions project into the first cavity opening a sufficient distance such that the distance between the protrusions on the two sidewalls is equal to or preferably less than the diameter of the capsule and permit the chemiluminescent capsule 10 to be pushed laterally therebetween by deforming its resilient outer casing 12 in order to position the capsule within the body for use of the lure or to remove the capsule from within the cavity. The distance between the protrusions is such that the capsule cannot pass by the protrusions once inside the cavity under the normal forces encountered on the capsule during the use of the lure in the water. Because the outer casing of the capsule is formed of resilient material, a capsule of a given diameter can be inserted through the opposite sidewall protrusions which are spaced apart by a distance slightly less than the diameter of the capsule. It is desirable to form the sidewalls at a spaced apart distance about equal to the diameter of the capsule to avoid unnecessary movement of the capsule when in place within the body cavity 198.

The protrusions 208 at the first cavity opening 198 are positioned inward from the outward edge portions of the opening to permit partial insertion of the cavity into the cavity opening for longitudinal alignment with the cavity prior to the capsule being pushed between the protrusions for positioning the capsule within the cavity. It is noted that since the sidewalls 200 and 202 are spaced apart by about the diameter of the capsule, the capsule may be easily and quickly placed partially within the cavity at the first cavity openimg in preparation for insertion. This allows partial insertion of the capsule in an aligned fashion within the cavity prior to pushing the capsule between the protrusions, and facilities and speeds up insertion of the capsule.

In the embodiment shown in FIG. 10, the second cavity opening 206 is of a restricted size with the opposed sidewalls 200 and 202 being formed into stop shoulders 210 and 212, respectively. The stop shoulders are spaced apart a distance to prevent passage of the capsule through the second cavity opening.

The lure body 196 has rigid spaced apart end flanges 214 and 216, each having an aperture 218 for tying of a fish line hook and the like to the lure. The portion of the body extending between the end flanges 214 and 216 include a pair of longitudinally extending body portions 220 and 222 which define the cavity 198 therebetween and have the body sidewalls 200 and 202, respectively, formed on the inward surface thereof. The body portions 220 and 222 are somewhat resilient and yieldably deformable in the lateral direction upon insertion and removable of the capsule and facilitate insertion of the capsule into the cavity and its retention therein. The combination of the protrusions 208 and the resilient body portions 220 and 222 allow the user to conveniently insert the capsule laterally into the body cavity 198 using his fingers and remove the capsule from the cavity by using his fingertip or fingernail, or an object pushing through the second cavity opening 206 to engage the capsule in the cavity and force it through the first cavity opening 204.

An alternative embodiment of the end flanges 214 and 216 is shown in FIG. 9A. In this embodiment an outwardly diverging lateral slot 219 is provided and extends laterally outward from the aperture 218. The slot in each end flange is sized to receive the fishing line (not shown) for sliding attachment of the lure 194 to the line. The slot is sized and positioned so that when the fishing line is taut under tension the line will not tend to exit the slot. The size of the aperture 218 receiving the fishing line may be selected to control the freedom with which the lure will slide along the line.

An alternative embodiment of the lure 194 of FIG. 9 is shown in cross-section in FIG. 11. In this embodiment, the second cavity opening 206 is defined by a laterally outward and longitudinally extending portions 224 and 226 of the sidewalls 200 and 202, respectively, converging toward each other at the second cavity opening. The sidewall portions 224 and 226 converge together to a distance therebetween substantially equal to or less than the diameter of the capsule such that the capsule can be pushed laterally through the second cavity opening by deforming the resilient outer casing 12 of the capsule for positioning the capsule within the cavity of more preferably for quick and easy removal therefrom. The distance between the sidewall portions is such that the capsule cannot pass out of the second cavity opening once within the cavity under the normal forces encountered on the capsule during use of the lure but yet removal is less difficult than pushing the capsule out between the protrusions 208 at the first cavity opening. With this embodiment it is preferred to insert the capsule through the first cavity opening which allows pre-alignment of the capsule and tends to "pop" the capsule into the central portion of the body cavity as it is pushed past the protrusions.

While the sidewalls are substantially planar in this embodiment, they have a slightly concave shape and, as discussed above, converge toward each other at the second cavity opening 206. The sidewall portions 224 and 226 converge toward each other from a position inward of the second cavity opening and define an elongated central cavity portion inward of the protrusions 208 at the first cavity opening 204 and inward of the converging sidewall portions at the second cavity opening to provide a longitudinally extending expansion location within the cavity where the capsule is positioned during usage.

Another alternative embodiment of the lure 194 of FIG. 9 is shown in cross-section in FIG. 12. In this embodiment, protrusions 208 are also provided on the sidewalls 200 and 202 at the second cavity opening 206. As with the protrusions at the first cavity opening 204, the protrusions at the second cavity opening are positioned opposite each other and project into the second cavity opening a sufficient distance such that the distance between the protrusions permits the capsule 10 to be pushed therebetween by deforming its resilient outer casing 12 for positioning the capsule within the cavity or removal of the capsule from the cavity.

A modified embodiment of the lure 194 is shown in FIGS. 13 and 14. A second modified version is shown in FIG. 15. These modified versions are shown attached to a ground line 228 and a ganglion 230 of a fishing longline in FIG. 16.

The embodiment of the invention shown in FIGS. 13 and 14 has a pair of longitudinally spaced apart line guides 232 each attached to the body portion 220 and an edge portion of one of the body end flanges 214 and 216. The guides are longitudinally inward from the outside ends of the end flanges. Each of the line guides 232 includes a pair of members 234 and 236 projecting outward from the body and laterally spaced apart to receive and retain therebetween, against lateral movement, a fishing line 238 to which the lure is to be attached. In a manner that will be described more fully below, the line guides facilitate positioning of the fishing line 238 adjacent to the body wall portion 220 and hold the fishing line away from the cavity openings 204 and 206 to prevent the fishing line from getting across the cavity openings and requiring it to be moved so that the capsule can be inserted into or removed from the cavity. This avoids the unnecessary delay of handling the line during insertion and removal of the capsule which is done for commercial fishermen as the line is being played out or pulled in. As such, if the process is slowed down as a result of having to contend with the fishing line blocking the cavity openings, the speed at which the fishing line can be played out or pulled in is decreased.

The lure 194 is provided with a flexible strap 238 having one end 240 fixedly attached to an edge portion of each of the body end flanges 214 and 216. The strap is further provided with a pointed free end 242. The fixed end 240 of the strap is attached to an edge wall of the body end flange opposite that to which the line guides 232 are attached.

A strap-receiving lock aperture 244 is formed in each of the body end flanges 214 and 216 adjacent to the strap attached to that end flanges. The strap 238 may be wrapped around the body end flange to which it is attached to pass over a flat exterior edge wall portion 246 of the body end flange adjacent to the line guide and opposite the edge wall to which the strap is attached. The edge wall portions 246 are positioned such that the fishing line 238 passes thereover when the line is received in the line guides 232. The strap has sufficient length to wrap around at least a part of the body end flange and overlay the corresponding flat edge wall portion 246 and frictionally engage the fishing line 238 passing thereover. The line is positioned between the strap and the flat edge wall portion when the strap is locked in position in a manner which will be described below.

The free end 242 of the strap 238 is insertable in the corresponding lock aperture 244 and when inserted fully therethrough may be pulled on to move the strap further through the aperture so as to adjustably tighten the strap around the fishing line 238 and apply a selectable frictional force on the fishing line for controlling the freedom of the lure 194 to slidably move along the fishing line. If sufficient force is applied, the fishing lure may be locked in place on the fishing line, or if less force is applied the lure may be set so as to be able to slide along the fishing line, as desired by the user. To maintain the position of the strap in the aperture, the strap includes a plurality of transverse ridge projections 248 along a mid portion of the strap length and the aperture has a tab 250 (see FIG. 14) to engage the projections to permit substantially free lengthwise passage of the strap through the aperture in one direction to tighten the strap around the line, but to lock and prevent removal of the strap from the aperture in the opposite direction. In cross-section, the projections 248 are triangular in shape with a sloped wall portion which is easily pulled by the tap 250 in one direction while an upright wall portion of the projection is engaged by the tab when pulled in the opposite direction to prevent movement in that direction.

The lure may be molded as an integral unit with the straps 238 formed integral with the body. It is noted that in this embodiment of the invention, the apertures 218 in the body end flanges 214 and 216 are not uitilzed since it is not necessary to tie the lure to the fishing line. As such, the fisherman does not have to cut and re-tie his existing longlines in order to use the lure. Furthermore, the lure provides a smooth profile to go through automatic baiters. If desired, the excess free end portion of the strap 238 may be cut off after the strap is locked in position within the lock aperture 244 to minimize interference with baiting equipment. It is further noted that by using adjustable straps, the lure may be used with fishing lines having a substantial variance in diameter merely by appropriately adjusting the tightness of the straps around the fishing line.

A modified version of the lure 194 of FIG. 13 is shown in FIG. 15. In this embodiment, the strap 238 has a series of edge serrations or ears 252 formed along the opposing edge portions of the strap. In this embodiment the lock aperture 244 is not utilized, but instead each of the straps is insertable through the aperture 218 provided in the body end flanges 214 and 216 for locking the strap into position. The aperture 218 is provided with a diameter and the straps have a width such that substantially free lengthwise passage of the strap through the aperture in the direction to tighten the strap around the fishing line 238 is permitted and movement of the strap in the opposite direction is prevented by the serrations engaging the face of the end flanges so as to lock the strap and prevent its removal.

Although the invention has been described and disclosed herein with respect to particular embodiments thereof, it is not intended that the invention be limited to these embodiments, but include all embodiments which are within the spirit and scope of the claims.

I claim:

1. An illuminated fishing lure for housing an elongated member having a resilient outer surface, comprising;

an elongated body including a longitudinally extending cavity at least as long as the member, the cavity being formed in the body by a pair of opposed generally planar sidewalls spaced apart a distance sufficient to receive the member therebetween, the cavity having first and second opposed longitudinally extending openings communicating with the body cavity and sized large enough to allow lateral passage of the member therethrough, the body further including at least one protrusion attached to one of the sidewalls and projecting into the first cavity opening a sufficient distance such that the member can be pushed past the protrusion by deforming its resilient outer layer for positioning the member within the cavity for use of the lure or removal of the member from within the cavity, but cannot pass by the protrusion once within the cavity under the normal forces encountered on the member during use of the lure.

2. The lure of claim 1 wherein the body further includes at least one protrusion attached to one of the sidewalls and projecting into the second cavity opening a sufficient distance such that the member can be pushed past the protrusion by deforming its resilient outer layer for positioning the member within the cavity for use of the lure or removal of the member from within the cavity but cannot pass by the protrusion once inside the cavity under the normal forces encountered on the member during use of the lure.

3. The lure of claim 1 wherein the body has rigid, spaced apart end portions with the pair of body sidewalls extending therebetween, the body sidewalls being resilient and yieldably deformable in the lateral direction upon insertion and removal of the member.

4. The lure of claim 3 wherein the body end portions each include an aperture for attachment of a fishing line, hook or the like to the body.

5. The lure of claim 1 wherein the body further includes at least one additional protrusion attached to an opposite one of the sidewalls and projecting into the first cavity opening a sufficient distance such that the distance between the protrusions on the two opposing sidewalls permits the member to be pushed therebetween by deforming its resilient outer layer for positioning the member within the cavity for use of the lure or removal of the member form within the cavity, the distance being such that the member cannot pass by the protrusions once inside the cavity under the normal forces encountered on the member during use of the lure.

6. The lure of claim 5 wherein the body has rigid, spaced apart end portions with the pair of body sidewalls extending therebetween, the body sidewalls being resilient and yieldably deformable in the lateral direction upon insertion and removal of the member.

7. The lure of claim 5 wherein the protrusions attached to the opposing sidewalls at the first cavity opening include a plurality of longitudinally spaced apart protrusions attached to each of the opposing sidewalls.

8. The lure of claim 5 wherein the cavity openings are defined by outward edge portions of the planar sidewalls, and the protrusions are positioned inward from the outward edge portions to permit partial insertion of the member into the first cavity opening for alignment with the cavity prior to being pushed between the protrusions for positioning the member within the cavity.

9. The lure of claim 5 wherein the sidewalls have outward portions which converge toward each other at the second cavity opening to a distance therebetween substantially equal to or less than the diameter of the member such that the member can be pushed laterally through the second cavity opening by deforming its resilient outer layer for positioning therefrom but cannot pass out the second cavity opening once within the cavity under the normal forces encountered on the member during use of the lure.

10. The lure of claim 9 wherein the sidewall portions converge toward each other from a position inward of the second cavity opening, and the sidewalls define an elongated central cavity portion inward of the protrusions at the first cavity opening and inward of the converging sidewall portions at the second cavity opening to provide a longitudinally extending expansion location within the cavity where the member can be positioned during usage.

11. The lure of claim 5 wherein the body further includes protrusions attached to each of the sidewalls at the second cavity opening and projecting into the second cavity opening a sufficient distance such that the distance between the protrusions on the two sidewalls permits the member to be pushed therebetween by deforming its resilient outer layer for positioning the member within the cavity for use of the lure or removal of the member from within the cavity, the distance being such that the member cannot pass by the protrusions once inside the cavity under the normal forces encountered on the member during use of the lure.

12. The lure of claim 11 wherein the body has rigid, spaced apart end portions with the pair of body sidewalls extending therebetween, the body sidewalls being resilient and yieldably deformable in the lateral direction upon insertion and removal of the member.

13. The lure of claim 1 for housing an elongated chemiluminescent capsule having a resilient outer surface, comprising:

an elongated body including a longitudinally extending cavity at least as long as the capsule, the cavity being formed in the body by a pair of opposed generally planar sidewalls spaced apart a distance sufficient to receive the chemiluminescent capsule therebetween, the cavity having first and second opposed longitudinally extending openings communicating with the body cavity, the first opening being sized large enough to allow lateral passage of the capsule therethrough, the body further including at least one protrusion attached to one of the sidewalls and projecting into the first cavity opening a sufficient distance such that a chemiluminescent capsule can be pushed past the protrusion by deforming its resilient outer layer for positioning the capsule within the cavity for use of the lure or removal of the capsule from within the cavity, but cannot pass by the protrusion once within the cavity under the normal forces encountered on the capsule during use of the lure, the body further including a stop attached to one of the sidewalls and projecting into the second cavity opening a distance to prevent passage of the capsule through the second cavity opening.

14. An illustrated fishing lure for housing an elongated member having a resilient outer surface, comprising:
- an elongated body including a longitudinally extending cavity at least as long as the member, the cavity being formed in the body by a pair of opposed sidewalls spaced apart a distance sufficient to receive the member therebetween, the cavity having at least one longitudinally extending opening communicating with the body cavity and sized large enough to allow lateral passage of the member therethrough;
- member retaining means for permitting selective insertion and removal of the member through the cavity opening, and for retaining the member within the cavity against the normal forces encountered on the member during use of the lure;
- a line guide positioned on a longitudinally extending exterior side wall portion of the body to receive and retain a line to which the lure is attached against lateral movement and away from the cavity openings;
- a pair of flexible straps each having one end attached to one of the two opposite end portions of the body, and having a free end;
- a pair of exterior wall portions of the body, each positioned at one of the two opposite end portions of the body for cooperation with one of the straps, the pair of exterior wall portions being positioned for the line to pass thereoever when received in the line guide;
- a pair of strap receiving lock apertures each at one of the two opposite end portions of the body and adjacent to one of the straps, each aperture lockbly retaining the corresponding strap therein, and each strap having a length sufficient to overlie the corresponding exterior wall portion and frictionally engage the line passing thereover between the strap and the exterior wall portion when the strap is locked in position within the corresponding strap aperture, the free end of each strap being insertable into the strap aperture and the strap being lengthwise adjustably positionable within the aperture and lockable at selective positions along at least a portion of its length to adjustably tighten the strap around the line and apply a selectable frictional force on the line for controlling the freedom of the lure to slidably move along the line.

15. The lure of claim 14 wherein the straps are formed integral with the body.

16. The lure of claim 14 wherein at least one of the straps includes a plurality of transversely extending sloped projections along a portion of the strap length and the lure further includes a tab positioned in the corresponding lock aperture to engage the sloped projections to permit substantially free lengthwise passage of the strap through the aperture in a direction to tighten the strap around the line and to lock and prevent removal of the strap from the aperture in an opposite direction.

17. The lure of claim 14 wherein at least one of the straps includes a plurality of serrations along opposing edge portions thereof along at least a portion of the strap length and the corresponding lock aperture includes a face wall extending about the aperture to engage the strap serrations to permit substantially free lengthwise passage of the strap through the aperture in a direction to tighten the strap around the lure and to lock and prevent removal of the strap from the aperture in an opposite direction.

18. The lure of claim 14 wherein the pair of exterior body wall portions over which the line passes for engagement with the straps are substantially flat surfaces.

19. The lure of claim 14 wherein the line guide includes at least two longitudinally spaced apart pairs of projections, each of the projections in a pair being laterally spaced apart a distance to receive the line therebetween but to substantially eliminate lateral movement of the line relative to the lure.

20. The lure of claim 19 wherein the pair of exterior body wall portions over which the line passes for engagement with the straps are a pair of substantially flat surfaces positioned adjacent to and longitudinally outward of the two longitudinally spaced apart line guide pairs of projections.

21. An illuminated fishing lure for housing an elongated member, comprising:
- an elongated body including a longitudinally extending cavity at least as long as the member, the cavity being formed in the body by a pair of opposed generally planar sidewalls spaced apart a distance sufficient to receive the member therebetween, the cavity having a pair of opposed longitudinally extending openings communicating with the body cavity and sized large enough to allow lateral passage of the member therethrough;
- member retainers positioned at the cavity openings permitting selective insertion and removal of the member through the cavity openings, and retaining the member within the cavity against the normal forces encountered on the member during use of the lure;
- line guides projecting away from the body and positioned on a longitudinally extending exterior sidewall portion of the body to receive and retain a line to which the lure is attached, the guides retaining the line against lateral movement and adjacent to the body sidewall portion and clear of the cavity openings;
- at least one flexible strap having one end fixedly attached to one of the two opposite end portions of the body, and having a free end;
- an exterior flat wall portion of the body positioned at the one of the two opposite end portions of the body at which the strap is located, the wall portion being positioned for the line to pass thereover when received in the line guides;
- a strap receiving lock aperture at the one of the two opposite end portions of the body at which the strap is located and adjacent to the strap, the aperture lockably retaining the strap therein, and the strap having a length sufficient to overlie the exterior wall portion and frictionally engage the line passing thereover between the strap and the exterior wall portion when the strap is locked in position within the strap aperture, the free end of the strap being insertable into the strap aperture and the strap being lengthwise adjustably positionable within the aperture and lockable at selective positions along at least a portion of its length to adjustably tighten the strap around the lure and apply a selectable frictional force on the line for controlling the freedom of the lure to slidably move along the line.

* * * * *